Oct. 16, 1956   A. H. P. BLOMQVIST ET AL   2,767,361
REMOTE CONTROL FOLLOW-UP SYSTEM FOR POSITIONING
A CONTROLLED UNIT BY A CONTROL UNIT
Filed June 13, 1952

INVENTORS.
ÅKE HUGO PETRUS BLOMQVIST
PER ÅKE LINDEGREN
BY
ATTORNEY.

United States Patent Office 2,767,361
Patented Oct. 16, 1956

2,767,361

REMOTE CONTROL FOLLOW-UP SYSTEM FOR POSITIONING A CONTROLLED UNIT BY A CONTROL UNIT

Åke Hugo Petrus Blomqvist, Johanneshov, and Per Å. Lindegren, Stockholm, Sweden, assignors to Aktiebolaget Bofors, Bofors, Sweden, a corporation of Sweden Application June 13, 1952, Serial No. 293,472

11 Claims. (Cl. 318—30)

This invention relates to follow-up systems for positioning a controlled unit by operation of a control unit situated at a remote point.

While follow-up systems of this kind have many useful applications, a now preferred field of application of the invention is the aiming of a gun by remote control, particularly the control of the azimuth adjustment of the gun.

There are known for this purpose remote control systems, the control unit and controlled unit of which are each connected to a signal generating synchronizing device. Each of these synchronizing devices or selsyn units comprises a stator and a rotor so that when an A.-C. voltage is supplied to the stator an output voltage is produced in the rotor winding the character of which depends upon the angular position of the rotor relative to the stator. By connecting the stators of the two devices and applying an alternating voltage to the rotor of one device a signal is obtained from the rotor of the other device. The form or envelope of this signal depends upon the difference between the position of the controlled unit and the control unit, the position of the latter unit determining the final position desired for the controlled unit. The signals obtained from the rotors of the synchronizer devices, which are in effect signal means, are fed through transmission means to drive means operatively coupled with the controlled unit for moving the same into the desired position. These transmission means generally include A.-C. amplifying means, phase detecting means, D.-C. amplifying means, and regulating or control means for control of the drive means.

As will appear from the previous explanations of the conventional remote control devices, the positioning of the controlled unit is effected by a signal the character or envelope of which is determined by the relative rotor position. An analysis of these signals shows that it may contain pure sine signals both of high and low frequency. Experience shows that these sine signals, particularly those of high frequency, tend to cause disturbances by causing the system to become self-oscillating. Generally, this is the case when the amplification in the system exceeds a certain value. In other words, to avoid self-oscillation of the system, the amplification should not exceed a certain value which value in turn is of course determined by the lay-out of the specific system. With signals of low frequency, disturbances in the nature of self-oscillations do not appear so that the amplification can be selected without regard to the aforementioned safe maximum value. Experience shows that self-oscillations generally occur in the chain of the components of the transmission means when the signals fed to the said transmission means have an amplification equal to one and a phase displacement of more than a certain angle of deviation from the phase angle of —180° or when the amplification exceeds a certain value at a phase angle equal to —180°. It is not practical to give definite values of the permissible deviation or amplification since these values vary from case to case but the values for a specific lay-out can always be accurately and easily determined by methods and steps well known for this purpose.

With remote control systems of the general type, herein referred to, it is desirable to use a relatively high amplification irrespectively whether or not the signals are of high frequency or of low frequency since a high amplification is necessary or at least advantageous for a rapid follow-up action of the controlled unit. Obviously, it is desirable to move the controlled unit, such as a gun, as quickly as possible into its end position.

It has already been proposed to associate the D.-C. amplifying means with a filter network including in each series arm capacitance means connected in parallel with resistance means and having a shunt arm including resistance means. A network of this type effects a certain positive phase shift thereby moving the permissible maximum amplification toward higher frequencies. However, it has been found that the phase shift effected by a network of the aforementioned design is not sufficient. Attempts have also been made to select the components of the network so that the frequency at which the phase angle of —180° occurs is increased. However, it was found that the increased frequency entailed a strong increase of the amplification in the network which is highly undesirable in view of possible self-oscillation as previously pointed out.

Accordingly, one of the principal objects of the present invention is to provide filter network means which effect a phase angle of —180° at a high frequency while limiting to a moderate and acceptable level the increase of the amplification caused by the increase of the frequency.

A more specific object of the invention is to provide filter network means which effect a larger positive phase shift within a narrow frequency range and without substantially increasing the amplitude curve of the filter network means at high frequencies.

Other and further objects, features and advantages of the invention will be pointed out hereinafter and set forth in the appended claims forming part of the application.

In the accompanying drawing several now preferred embodiments of the invention are shown by way of illustration and not by way of limitation.

Figure 1A:
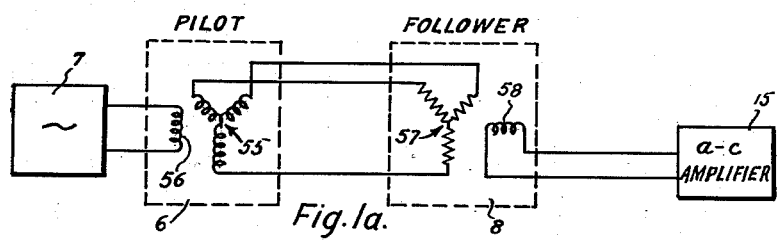
Fig. 1a is a circuit diagram of the selsyn units.
Figure 1:
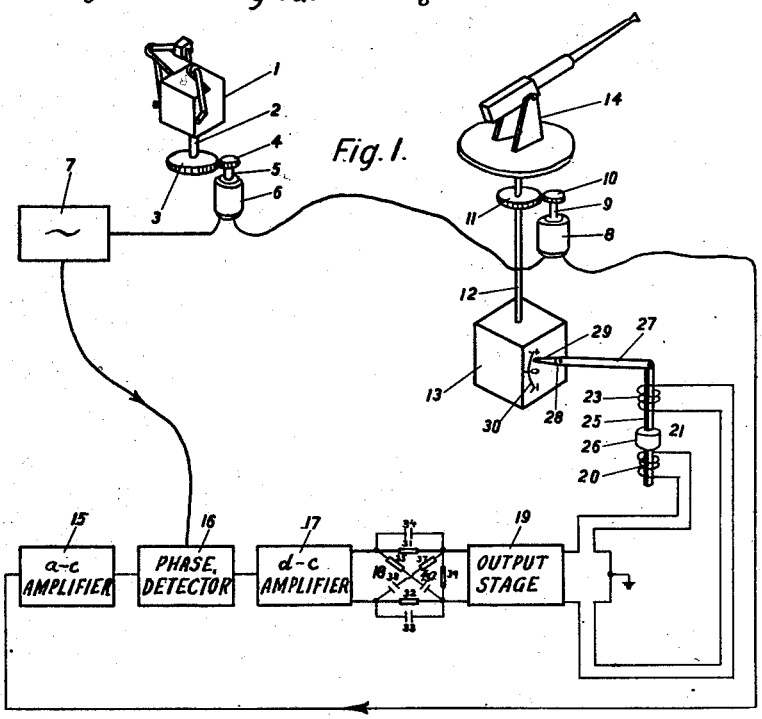
Fig. 1 is a diagrammatic view of a follow-up system according to the invention.

Referring first to Figs. 1 and 1a in detail, the follow-up system according to this figure comprises a gun sight 1 of conventional design. This sight constitutes the control unit of the system and includes, among other components, a control bow mounted for pivoting about a horizontal axis and rotation about a vertical axis, pivoting about the horizontal axis serving to vary the elevational position of the gun and rotation about the vertical axis to vary the azimuth or lateral position of the gun. The latter adjustment is the one with which the system according to the invention is primarily concerned. A rotation of the control bow is transmitted by suitable coupling means diagrammatically shown as a shaft 2, gears 3, 4 and a shaft 5 to a synchronizing device 6. This device or selsyn unit is of conventional design and should be visualized as comprising a stator and a rotor each provided with appropriate windings 55 and 56 respectively, shaft 5 constituting the rotor shaft so that a rotation of the control bow varies the angular position of the rotor windings relative to the stator windings.

The controlled unit of the system is shown as a gun 14, the platform of which supports a rotary shaft 12 on which is fixed a gear 11. This gear meshes with a gear 10 secured to the rotor shaft 9 of a synchronizing device or selsyn unit 8 similar to the synchronizing device 6 and having stator windings 57 and rotor windings 58. As will be evident, the transmission means between shaft 9 and the gun platform are illustrated in a diagrammatic manner only.

The rotor windings 56 of device 6 are connected to an A.-C. source 7 and the stator windings 55 and 57 of the two devices are interconnected. However, it would also be possible to feed the A.-C. potential to the rotor winding 58 of device 8. As will be apparent, the character of the output signals of the devices is determined by the relative position of the rotors of the devices, or in other words by the relative position of control unit 1 and controlled unit 14. It will further be apparent that the two devices function in the nature of an A.-C. selsyn system and any conventional system of this type can be employed.

Shaft 12 is rotated by means of a rotary drive unit 13. The design of this drive unit does not constitute part of the present invention. It suffices to say that it is reversible and adjustable as to speed. The drive unit is symbolized by a block.

The rotor windings 58 of device 8 are connected to the input side of A.-C. amplifying means 15 of conventional design the output side of which is connected to conventional phase detecting means 16 which are also connected to the A.-C. source 7 so that the same A.-C. potential is fed to the detecting means as is fed to the rotor windings of device 6. The phase detecting means are followed by D.-C. amplifying means 17, filter network means 18 and an output stage 19 which may include an electronic valve coupling of conventional design. All the aforementioned means are connected in a cascade circuit. The output stage 19 is connected with a control device 21 shown as a differential relay. This relay comprises two coils 20 and 23 of which coil 20 is connected in a circuit between one terminal of output stage 19 and ground and coil 23 is connected between the other terminal of output stage 19 and ground. The differential relay further comprises a movable core bar 25 supporting an armature 26 the position of which relative to coils 20 and 23 is controlled by the flow of current through these coils as will be more fully explained hereinafter. The differential relay serves to control the operation of drive unit 13. The operative coupling between the relay and the drive unit is diagrammatically shown as an arm 27 pivoted on one end to bar 25 extending from armature 26 and at the other end to a shaft 28 which should be visualized as controlling the drive unit as to direction and speed in response to a displacement or armature 26 relative to the relay coils. A pointer 29 movable together with shaft 28 and coacting with a scale 30 serves to indicate the speed and rotational direction of the drive unit.

The entire system, as hereinbefore described, is or may be conventional so that it is believed that a detailed description of the drive unit is not essential for the understanding of the invention.

As previously explained, the principal novel feature of the invention resides in the filter network means 18. These means are shown on Figs. 1 and 2 as a cross-filter network, the series arms of which include resistance means 31 and 32 connected in parallel with capacitance means 34 and 33 respectively. The shunt arm of the network includes resistance means 39 and each of the cross-arms of the network includes resistance means and capacitance means 35, 40, and 37, 38 respectively.

Figure 2:
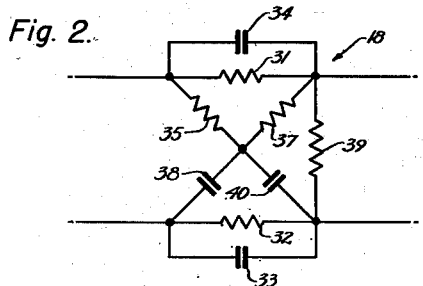
Fig. 2 is a circuit diagram of the filter network of Fig. 1 on an enlarged scale.

The filter network of Figs. 1 and 2 can be varied in several respects.

Figure 3:
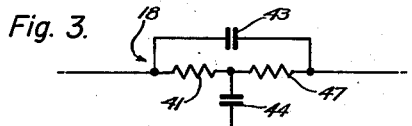
Fig. 3 is a circuit diagram of a modification of the filter network.

Fig. 3 shows a T-network the series arm of which includes resistance means 41 and 42 in series connection and capacitance means 43 connected in parallel across the resistance means. The shunt arm is connected to the junction point between the two resistance means and includes the capacitance means 44 which can also be replaced by resistor means.

Figure 4:
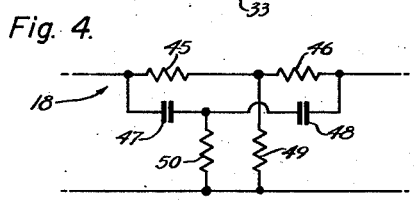
Fig. 4 is a circuit diagram of another modification of the filter network.

The network according to Fig. 4 is a T-network, the series arm of which comprises two resistance means 45 and 46 connected in series and two capacitance means 47 and 48 connected in parallel across the two resistance means. One shunt arm of the network is connected to the junction point between the two resistance means and includes resistance means 49 and a second shunt arm is connected to the junction point between the two capacitance means and includes resistance means 50.

Figure 5:
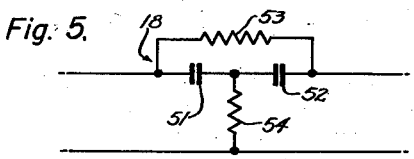
Fig. 5 is a circuit diagram of still another modification of the filter network.

The T-network of Fig. 5 is a reversal of the network of Fig. 3. Accordingly, the series arm of the network comprises capacitance means 51 and 52 in series connection and resistance means 53 connected in parallel across the capacitance means. The shunt arm of the network is connected to the junction point between the two capacitance means and includes resistance means 54.

The respective components of the filter networks according to Figs. 1 to 5 and of similar networks are so designed that all the networks have equal characteristics. These characteristics may be expressed by the following equation:

$$\frac{V_2}{V_1} = \frac{T_3 \cdot T_2}{T_1^2} \cdot \frac{1 + 2 \cdot k \cdot j\omega T_1 - \omega^2 \cdot T_1^2}{(1 + j\omega T_2)(1 + j\omega T_3)}$$

wherein:

$V_1$ = input voltage of the network
$V_2$ = output voltage of the network
$T_1$ = a constant dependent upon the magnitude of the components of the network
$T_2$ = a constant dependent upon the magnitude of the components of the network
$T_3$ = a constant dependent upon the magnitude of the components of the network
$k$ = a constant dependent upon the magnitude of the components of the networks, the said component being generally less than 1.
$\omega$ = the angular frequency.

The operation of the follow-up system, as hereinbefore described, is as follows:

As previously stated, the envelope or character of the output signal of the rotor of the device 8 is a function of the relative position of the rotors of the two devices or, in other words, a function of the deviation of the position of the controlled unit from the position of the control unit. The system is so adjusted, as is well known for the purpose, that the output signal of the rotor of device 8 has a predetermined value when the position of the controlled unit corresponds to the position of the control unit. Generally, the system is set for a zero signal when the positions of the two units are synchronized.

The phase detector 16 to which is fed the same A. C. potentia as to the rotor of device 6 generates a positive D. C. signal when the output signal from the rotor of device 8 is in phase with the signal from the A. C. source 7, and a negative D. C. signal is generated by the detector when the signal from the rotor of device 8 is in opposite phase. The D. C. signals are then fed to the D. C. amplifying means 17, the filter network 18 and the output stage 19. Coils 20 and 23 of differential relay 21 are so connected to the D. C. amplifier 17 that the D. C. currents flowing through the coils are equal when the positions of the controlled unit and the control unit are equalized, that is, when the gun is in the position demanded by the sight.

Let it now be assumed that detector 16 generates positive direct current. Then, the flow of current through coil 20 is increased and the flow of current through coil 23 is decreased. As a result, armature 26 is attracted by coil 20 thereby actuating drive unit 13 to operate in a direction in which the gun is moved toward a position in which the output signal of the rotor of device 8 becomes zero. The speed with which the drive unit operates and hence the gun is moved depends upon the strength of the output signal from the rotor of device 8. The stronger this signal is the more the armature 26 will be attracted thereby setting the drive unit for a higher speed.

When the current from the detector 16 is negative, armature 26 is attracted by coil 23 and the gun is moved in the opposite direction again with a speed dependent upon the strength of the signal.

Filter network 18 effects a phase shift of the signals fed to the amplifier 15 so that the aforementioned desirable phase angle of $-180°$ occurs at a high frequency while limiting the amplification power of the network to a moderate value as the frequency increases. The phase shift is positive and occurs within a narrow frequency range. In this connection it should be mentioned that the term "low frequencies" as herein referred to refers to frequencies within a range of 0–2 cycles/sec. and the term high frequencies refers to frequencies within a range of 2–50 cycles/sec.

Filter network means, as herein described, have the advantage that the amplification produced by the amplifiers in the transmission chain 15 to 19 can be substantially increased beyond the values hitherto permissible. As previously explained, this is highly desirable for rapid movement of the gun or other controlled unit into the position demanded by the control unit. Filter networks according to the invention afford also the advantage that capacitors and resistors only are used. Components of this type have linear changes and can be inexpensively and accurately manufactured.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

We claim:

1. A follow-up system for rapidly positioning a controlled unit by a control unit situated at a remote point, the said system comprising electric signal means including selsyn devices, an A. C. source, A. C. amplifying means and phase detecting means operatively connected with the control unit and the controlled unit and arranged to generate a demodulated A. C. error signal of a character variable corresponding to the position of the control unit and the controlled unit relative one to the other, the said signals including low and high frequencies and having a varying phase angle, D. C. amplifying means connected in circuit with said error signal means for feeding the said signal to the input side of the D. C. amplifying means, reversible drive means operatively connected with the controlled unit for moving the latter and included in a control circuit with the D. C. amplifying means for directional control of the drive means by the output signal of the said amplifying means, and filter network means included in the circuit connections between the D. C. amplifying means and the drive means, the said filter network means effecting a larger positive phase lead of the signal within the frequency range in which the system is subject to self-oscillation whereby the amplitude curve as a function of the frequency is limited to a small increase at frequencies within the said range and at higher frequencies.

2. A follow-up system for rapidly positioning a controlled unit by a control unit situated at a remote point, the said system comprising electric signal means including selsyn devices, an A. C. source, A. C. amplifying means and phase detecting means operatively connected with the control unit and the controlled unit and arranged to generate a demodulated A. C. error signal of a character variable corresponding to the position of the control unit and the controlled unit relative one to the other, the said signals including low and high frequencies and having a varying phase angle, D. C. amplifying means connected in circuit with said signal means for feeding the said signal to the input side of the D. C. amplifying means, reversible drive means operatively connected with the controlled unit for moving the latter and included in a control circuit with the D. C. amplifying means for directional control of the drive means by the output signal of the said amplifying means, and filter network means included in the circuit connection between the D. C. amplifying means and the drive means, the components of the said filter network means being arranged so as to shift signal of high frequency to a phase angle of $-180°$ while limiting the increase of the amplitude curve as a function of the frequency to a value below the value at which the system is subject to self-oscillations.

3. A follow-up system as defined in claim 1, wherein the components of the said filter network means are selected and adjusted relative one to another so as to satisfy the equation:

$$\frac{V_2}{V_1} = \frac{T_3 \cdot T_2}{T_1^2} \cdot \frac{1 + 2 \cdot k \cdot j\omega T_1 - \omega^2 \cdot T_1^2}{(1 + j\omega T_2)(1 + j\omega T_3)}$$

wherein:

$V_1$ = input voltage of the network
$V_2$ = output voltage of the network
$T_1$ = a constant dependent upon the magnitude of the components of the network
$T_2$ = a constant dependent upon the magnitude of the components of the network
$T_3$ = a constant dependent upon the magnitude of the components of the network
$k$ = a constant dependent upon the magnitude of the components of the networks, the said component being generally less than 1.
$\omega$ = the angular frequency 4. A follow-up system as defined in claim 3, wherein the said filter network means are in form of a cross-filter network.

5. A follow-up system as defined in claim 4, wherein each series arm of the said cross-filter network includes resistance means and capacitance means in parallel connection.

6. A follow-up system as defined in claim 5, wherein the shunt arm of the said cross-filter network includes resistance means.

7. A follow-up system as defined in claim 6, wherein each of the cross-arms of the said cross filter network includes resistance means and capacitance means in series connection.

8. A follow-up system as defined in claim 3, wherein the said filter network means are in form of a T-network comprising a series arm including two resistance means in series connection and capacitance means connected in parallel across the resistance means, and a shunt arm connected to the junction point between the said two resistance means in the series arm and including capacitance means.

9. A follow-up system as defined in claim 3, wherein the said filter network means are in form of a T-network comprising a series arm including two resistance means in series connection and two capacitance means in series connection and connected in parallel with the resistance means, a first shunt arm connected to the junction point between the said resistance means of the series arm and including resistance means, and a second shunt arm connected to the junction point between the two capacitance means of the series arm and including resistance means.

10. A follow-up system as defined in claim 3, wherein the said filter network means are in form of a T-filter network comprising a series arm including two capacitance means connected in series one with the other and in parallel with resistance means, and a shunt arm connected to the junction point of the said capacitance means and including resistance means.

11. A follow-up system for rapidly positioning a controlled unit by a control unit situated at a remote point, the said system comprising electric signal means operatively connected with the control unit and the controlled unit and arranged to generate a demodulated error signal of a character variable corresponding to the position of the control unit and the controlled unit relative one to the other, the said signal including low and high frequencies and having a varying phase angle, drive means operatively connected with the controlled unit for moving the latter, electronic chain transmission means connecting the signal means in a control circuit with the drive means, the said transmission means including A. C. amplifying means connected to the signal means, phase detecting means connected to the said amplifying means, D. C. amplifying means connected to the detecting means, and electric control means controlled by the signal output of the D. C. amplifying means and controlling the operation of the drive means in accordance with the character of the said signal, the said D. C. amplifying means including filter network means effecting a large positive phase lead of the signal within the frequency range in which the system is subject to self-oscillation whereby the amplitude curve as a function of the frequency is limited to a small increase at frequencies within said range and at higher frequencies.

References Cited in the file of this patent

UNITED STATES PATENTS

| | | |
|---|---|---|
| 2,233,415 | Hull | Mar. 4, 1941 |
| 2,439,198 | Bedford | Apr. 6, 1948 |
| 2,446,567 | White et al. | Aug. 10, 1948 |
| 2,472,167 | Matson et al. | June 7, 1949 |
| 2,605,451 | Ward et al. | July 29, 1952 |

OTHER REFERENCES

"Theory of Servo Mechanism," James, Nichols and Phillips, McGraw-Hill Co., 1947, pp. 114–124.

"Servo Mechanism Fundamentals," Lauer, Lesnick Matson, McGraw-Hill, 1947, pp. 158–171.

"Electronic Instruments," Greenwood, Holdam, Macrae, McGraw-Hill, 1948, pp. 329, 340, 341.

Publication of Abstract, Lesnick, 635 O. G. 315, June 6, 1950.